E. RUHLMANN.
Cultivator.
No. 212,575.  Patented Feb. 25, 1879.
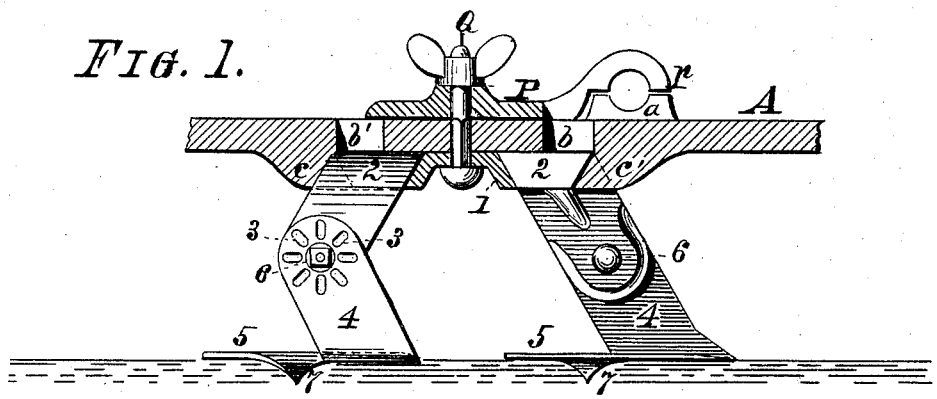
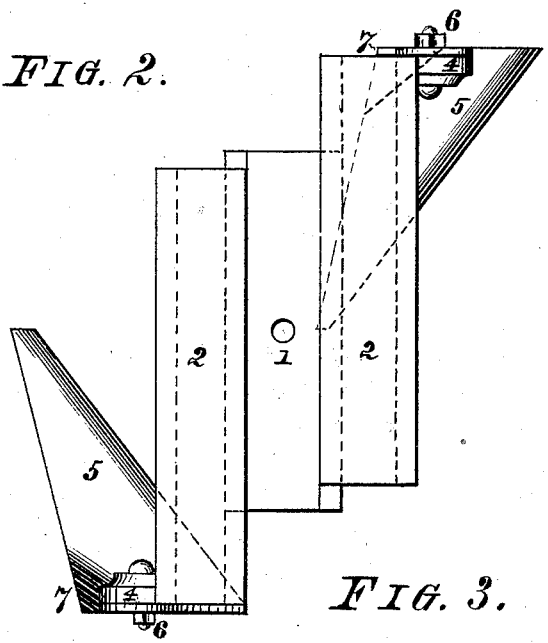
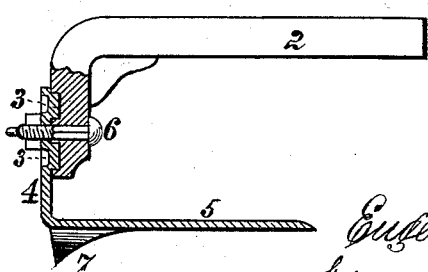
Witnesses: Frank Hirsch, Fred'k C. Juergens
Inventor: Eugene Ruhlmann by Michael J. Stark atty.

UNITED STATES PATENT OFFICE.

EUGENE RUHLMANN, OF LOCKPORT, NEW YORK.

IMPROVEMENT IN CULTIVATORS.

Specification forming part of Letters Patent No. 212,575, dated February 25, 1879; application filed June 18, 1878.

*To all whom it may concern:*

Be it known that I, EUGENE RUHLMANN, of Lockport, in the county of Niagara and State of New York, have invented certain new and useful Improvements on a Cultivator or Wheel-Hoe; and I do hereby declare that the following description of my said invention, taken in connection with the accompanying sheet of drawings, forms a full, clear, and exact specification, which will enable others skilled in the art to which it appertains to make and use the same.

This invention has special reference to improvements in walking-cultivators; and said improvements consist in the peculiar arrangement of parts and details of construction, as hereinafter first fully set forth and described, and then pointed out in the claims.

In the drawings hereinbefore mentioned, which serve to illustrate my invention more fully, Figure 1 is a fragmental sectional elevation of my cultivator, illustrating the manner of attachment of the cultivator-knives. Fig. 2 is a plan of the knives and clamp for holding said knives to the platform. Fig. 3 is a detail view.

Like letters of reference indicate corresponding parts in all the figures.

A is the bed-plate or platform of my walking-cultivator. It is bifurcated in front to receive a wheel between the two forks, and has handles (not shown) in the rear for manipulating the machine, all of which may be constructed in any desired manner. On the under side of the platform are cast or otherwise affixed two projections, $c\ c'$, forming a dovetailed channel, within which the cultivator-knives are adjustably held in position by means of a bolt, Q, and clamp 1, as hereinafter to be referred to. These knives consist each of a cast-iron shank, 2, having beveled edges, as shown in Fig. 1, and its forward end bent at right angles, said bent part being provided with an aperture for the passage of a bolt, 6, by means of which the knife proper, 5, is attached to said shank. Around this aperture are radially-arranged depressions, and on the part 4 of the knife 5 are provided similar projections, 3, engaging said depressions, the bolt 6 passing through both parts and securing them firmly together. By this manner of attachment I am enabled to adjust the position of the knives relatively to the shanks 2, and then firmly and securely hold them after being adjusted.

The front shank, 2, is forwardly, and the rear one rearwardly, bent, as shown in Fig. 1, so as to separate the knives 5 sufficiently to allow them to pass each other. The knives 5 are both forwardly bent—that is to say, the front edges of the parts 4 incline forwardly, while the knives proper, 5, are rearwardly inclined, as illustrated in Fig. 2, so as to produce a draw-cutting action, and thus to better sever the roots and stalks of the weeds to be removed by this apparatus.

The shanks 2 are held in position on the platform A by the lugs $c\ c'$ and a transverse plate, 1, fastened to the platform by the bolt Q, the edges of the shanks 2, as well as the lugs $c\ c'$ and those of the plate 1, being beveled, so as to securely retain the parts.

It will be readily seen that to adjust the relative distance between the knives the thumb-screw on the bolt Q is slightly slackened, when the knives may be readily slid in and out of the dovetailed channels formed by the projections $c\ c'$ and plate 1, and lateral adjustment effected in a few moments' time.

I prefer to construct the knives 5 of sheet-steel, cut and bent into proper shape, and drop-stamping the projections 3 into the same. In this manner I can produce knives of superior quality at but trifling expense, and can furnish accurate duplicates at any time in case a renewal should be necessary.

In a cultivator constructed similar to the above the knives or teeth have a tendency to throw or push the soil between the uprights of said knives, and thus uncover the roots and plants in the adjoining rows. This is an objection, which I have overcome by dropping the edges 7 of the teeth 5 downward on the junction of the tooth proper, 5, with the upright 4, whereby the soil, in, as it were, passing over the teeth, is allowed to slide back and heave up on the sides of the uprights 4, thus leading the soil back to the hills, and thereby covering the plants and roots.

Having thus fully described my invention, I claim as new, and desire to secure by Letters Patent of the United States—

1. The combination, with the platform A, of the cultivator hoes or knives described, having the beveled shanks 2, engaging the beveled lugs c c', said hoes being adjustably held to the platform by the clamping-plate 1, having its beveled edges engaging the adjacent beveled edges of said shanks 2, as and for the purpose specified.

2. As an improved article of manufacture, cultivator-knives constructed entirely of sheet metal, said knives having the standards 4 arranged obliquely to the plane of the blades 5, and their upper ends provided with radial projections and indentations 3, stamped into said standards, substantially in the manner as and for the purpose specified.

3. The knives described, consisting of the separate shanks 2, having beveled edges, and one end bent at right angles, said bent end being provided with radial indentations around the bolt-hole, and the knives 5, provided on their uprights 4 with the radial projections 3, said knives being secured to the shanks 2 by the bolts 6, as specified.

4. In a cultivator, the knives described, having the front shank, 2, forwardly, and the rear shank rearwardly, inclined, and provided with detachable knives, having the part 4 forwardly, the part 5 rearwardly, and the corners 7 downwardly inclined, as and for the object specified.

In testimony that I claim the foregoing as my invention I have hereunto set my hand and affixed my seal in the presence of two subscribing witnesses.

E. RUHLMANN. [L. S.]

Attest:
MICHAEL J. STARK,
FRANK HIRSCH.